J. S. SPENCER.
EYE-GLASSES.

No. 188,264.  Patented March 13, 1877.

Witnesses:
William J. Mann
Frank H. Gray

John S. Spencer
Inventor

UNITED STATES PATENT OFFICE.

JOHN S. SPENCER, OF NEW YORK, N. Y.

IMPROVEMENT IN EYEGLASSES.

Specification forming part of Letters Patent No. 188,264, dated March 13, 1877; application filed January 22, 1877.

*To all whom it may concern:*

Figure 1:
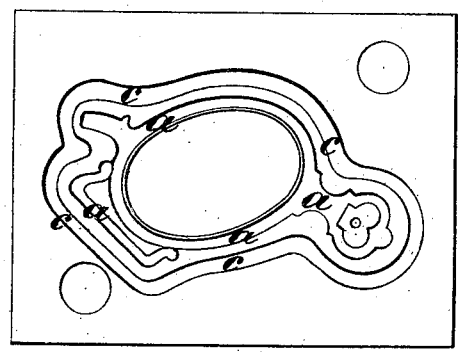
Figure 2:
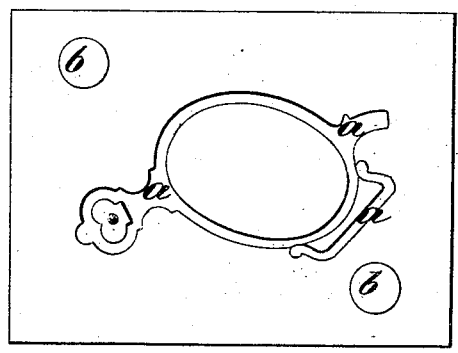

Be it known that I, JOHN S. SPENCER, of New York, N. Y., have invented an Improvement in Making Frames for Eyeglasses, Spectacles, Reading-Glasses, Watchmakers' Loops, &c., out of any plastic material, or material that can be made plastic, of which the following is a specification:

My invention consists of a set of depressed dies made in two pieces, as shown in Figures 1 and 2 of the drawing, so made that the surfaces of the plates in which the dies are made, when brought in contact, fit closely together, the depressed grooves or channels (marked $a$ in each of said figures) so corresponding that when the plastic material is placed between them and submitted to pressure it is forced or molded into the shape required for the frame. These plates are kept in place by means of two dowel-pins, $b\ b$. (Shown in Fig. 1.) The channel $c\ c\ c\ c$ in Fig. 1 receives any part of the material that is in excess of the exact amount required to make the frame wanted, usually called the "overflow."

Figure 3:
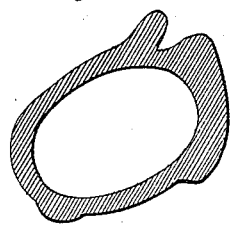
Figure 4:
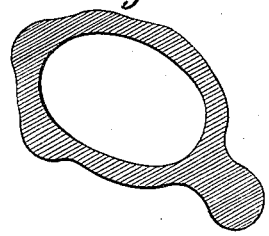
Figure 5:
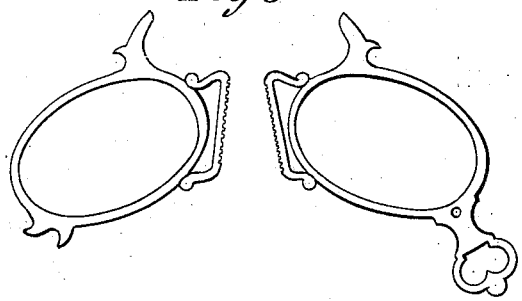

The plastic material is first prepared by being forced by strong hydraulic pressure through a nozzle or orifice, having lugs or tongues, so as to leave the material in a tubular form, as shown in Figs. 3 and 4, and in such shape that it can be pressed or molded in frames with little or no waste of material. Fig. 3 shows the frame of the eyeglass as it leaves the die.

Material that has to be melted, such as metals or india-rubber, cannot be used. Celluloid or other material that can be made plastic can alone be used. There are no knife-edges in the dies. The plastic material is forced into and completely fills all the grooves and channels of the dies, and so molds or forms it that it retains the exact form of the dies, and comes from it ready for use, obviating the necessity of filing or paring it into shape, as required by any other process, thus greatly facilitating the manufacture of frames. Frames for spectacles, reading-glasses, watchmakers' loops, and other frames, are formed by the same process.

I claim as my invention—

The dies of the character above described, for making frames for glasses or other articles out of plastic material, or material that can be made plastic, substantially as shown and set forth.

JOHN S. SPENCER.

Attest:
  WILLIAM J. MANN,
  FRANK H. GRAY.